United States Patent [19]

von der Ohe

[11] 4,444,415

[45] Apr. 24, 1984

[54] INDEPENDENT WHEEL SUSPENSION

[75] Inventor: Manfred von der Ohe, Stuttgart, Fed. Rep. of Germany

[73] Assignee: Daimler-Benz AG, Stuttgart, Fed. Rep. of Germany

[21] Appl. No.: 334,075

[22] Filed: Dec. 23, 1981

[30] Foreign Application Priority Data

Dec. 23, 1980 [DE] Fed. Rep. of Germany ....... 3048794

[51] Int. Cl.$^3$ ............................................... B60G 3/00
[52] U.S. Cl. ..................................... 280/701; 280/690
[58] Field of Search ........................ 280/675, 690, 701

[56] References Cited

U.S. PATENT DOCUMENTS

| 3,189,118 | 6/1965 | Arning | 280/701 |
|---|---|---|---|
| 3,871,467 | 3/1975 | Senft et al. | 280/701 |
| 3,892,284 | 7/1975 | Braess et al. | 280/690 |
| 4,269,432 | 5/1981 | Inoue et al. | 280/690 |
| 4,273,356 | 6/1981 | Sakata et al. | 280/675 |
| 4,313,619 | 2/1982 | Hailer | 280/675 |

FOREIGN PATENT DOCUMENTS 2614285 10/1977 Fed. Rep. of Germany ...... 280/675

OTHER PUBLICATIONS

*Racing Car Design and Development*, by Len Terry and Alan Baker, published 1973, p. 217.

Primary Examiner—Joseph F. Peters, Jr.
Assistant Examiner—Ross Weaver
Attorney, Agent, or Firm—Craig & Burns

[57] ABSTRACT

An independent wheel suspension for driven rear wheels of motor vehicles, which includes a wheel carrier guided through five single links articulated on the wheel carrier side and on the vehicle body side. The lower articulation for the wheel carrier is formed by a longitudinal link extending obliquely forwardly and inwardly as a compression strut and by a transverse link, with points of articulation of the compression strut and transverse link on the carrier being located near to one another. An upper articulation for the wheel carrier is formed by a transverse link, as a camber strut, and by a forwardly extending longitudinal link as a tension strut. A track rod extends in a transverse direction of the vehicle with a wheel spring suspension, formed by a shock absorber and non-guiding spring. The compression strut extends obliquely forwardly and inwardly with the transverse link, functioning as a spring link, in carrying the spring and shock absorber. An articulation point of the spring link on a wheel carrier side is disposed behind a transversely extending center plane of the wheel and near a longitudinally extending center phase, with the spring like extending behind the transversely extending center plane of the wheel in such a manner that an intersection point between the longitudinal axes of the compression strut and spring link is located behind a transversely extending center plane of the wheel and near the longitudinally extending center plane of the wheel. A track rod is located forwardly of the transversely extending center plane of the wheel and extends in a transverse direction obliquely forwardly and inwardly.

26 Claims, 3 Drawing Figures

INDEPENDENT WHEEL SUSPENSION

The present invention relates to a suspension arrangement and, more particularly, to an independent wheel suspension for driven rear wheels of motor vehicles, especially passenger motor vehicles, with the wheel suspension including a wheel carrier guided by way of five single links articulated on the wheel carrier and on a portion of a body of the vehicle. The lower articulation for the wheel carrier, formed by a longitudinal link extending obliquely forwardly and inwardly, as a compression strut, and a transverse link. The points of articulation of the compression strut and transverse link on the wheel carrier are disposed near to one another. An upper articulation for the wheel carrier, is formed by a transverse link, constructed as a camber strut, and a longitudinal link extending forwardly, as a tension strut, as well as a track rod extending in a transverse direction of the vehicle. The arrangement provides for a wheel spring suspension formed by a shock absorber and a non-guiding spring.

An independent wheel suspension of the aforementioned type is proposed in, for example, *Automobile Engineer*, May 8, 1970, page 226 and, although this proposed wheel suspension provides good wheel guidance properties, a disadvantage resides in the fact that installation of this proposed wheel suspension requires a considerably large amount of space since the compression strut and tension strut are comparatively long and extend a considerable distance forwardly. Moreover, the track rod, disposed behind a transversely extending center plane of the wheel, extends virtually to the center of the vehicle.

Additionally, a further disadvantage of the above proposed wheel suspension arrangement resides in the fact that, since it is designed primarily for utilization in a sports vehicle, the resulting suspension of the vehicle is relatively rigid and the single links are attached to the vehicle body and wheel carrier in a virtually non-elastic manner such that, regardless of the application of force, neither braking nor starting forces may cause any significant changes in the wheel position and, the support of the spring and shock absorber on the wheel carrier, with the forces thus generated acting on the wheel carrier, having no negative influence.

Since the above proposed wheel suspension arrangement is designed primarily for sports vehicles, it is not readily possible to transfer such proposed arrangement to production vehicles and, particularly, to vehicles which seek to provide a superior class of comfort because, by the provision of appropriate elastic mounting means at the points of articulation which are necessary for reasons of comfort, the handling characteristics of the suspension arrangement would be considerably impaired. Moreover, distortions of the elastic mounting means would also arise as a result of tilting forces occurring from the construction of the suspension arrangement which forces act on the wheel carrier, with the distortions considerably reducing the effectiveness of the elastic mounting means with regard to the comfort to be achieved.

However, wheel suspension arrangements of the aforementioned type would offer substantial advantages for modern passenger motor vehicles since the present aim of such motor vehicles is a lightweight construction, since the links of the suspension arrangement are free of torsional forces and could therefore be made even of relatively simple sheet-metal parts.

The aim underlying the present invention essentially resides in providing a wheel suspension arrangement of the aforementioned type which is spatially compact, of lightweight construction, and which nevertheless maintains high handling characteristics while nevertheless achieving good driving comfort.

In accordance with advantageous features of the present invention, a wheel suspension arrangement is provided wherein, by virtue of the fact that a compression strut extends obliquely forwardly and inwardly, the transverse link, constructed as a spring link carrying the spring and shock absorber, is located with an articulation point to the wheel carrier at a position behind the transversely extending wheel center plane near a longitudinally extending center plane of the wheel. The transverse link extends behind the transversely extending wheel center plane in such a manner that an intersection point between the longitudinal center axis of the compression strut and spring link is disposed at a position behind the transversely extending wheel center plane near the longitudinally extending wheel center plane. The track rod is advantageously located forwardly of the tranversely extending wheel center plane and extends obliquely forwardly and inwardly.

By virtue of the above-noted features of the present invention, tilting forces acting on the wheel carrier which are caused by the spring or shock absorber forces are largely eliminated because the spring link is articulated on the wheel carrier virtually in the longitudinally extending wheel center plane. Moreover, by virtue of the arrangement of the compression strut, it is possible to provide a compression strut which has a relatively short length and nevertheless realize an intersection point between the longitudinal axis of the compression strut and spring link which makes it possible to realize for the respective wheels, in an ideal or optimum pivot axis which has a pivot point through the wheel contact plane which is located behind the transversely extending center plane of the wheel. The above noted features result in a favorable track behavior of the wheel suspension arrangement under the influence of the lateral forces so that such forces may be absorbed without negatively influcencing the handling characteristics of the suspension arrangement even in the case of the provision of soft elastic articulation means for connecting the respective links to the vehicle.

Additionally, it has been determined that, with the construction of the present invention, starting and braking forces may also easily be massed without any negative influence on the handling characteristics of the vehicle even when the piercing point of the ideal steering axis is offset inwardly with respect to the transversely extending wheel center plane of the vehicle thereby providing a positive steering offset. Although braking forces then tend to force the wheel in a toe-out direction, nevertheless, in conjunction with the resilence of the compression link, the track rod causes the wheel to twist in an opposite direction. Consequently, at least a neutralization of the forces can be accomplished.

Additionally, at least a virtually neutral behavior of the suspension arrangement may be achieved with regard to starting forces acting in the center of the wheel since, with the ideal steering axis positioned as described above, a short lever arm is obtained with respect to the steering axis. This is especially true when the ideal intersection point of the upper links of the suspension arrangement determining the upper articulation point is located near the longitudinally extending center plane of the wheel or outside of such plane.

With regard to any tendency for a toeing-in of the wheel suspension arrangement under the influence of starting forces, by virtue of the present invention, such tendency is counteracted by the track rod extending in a transverse direction obliquely forwardly so that at least a neutralization of the forces can be achieved and, in all cases, the particular effect desired can be further reinforced, in a conventional manner, by appropriate selection of the elasticities of the elastic mounting means and coordination of the mounting means with respect to one another.

In accordance with the present invention, the articulation point of the compression strut at the wheel carrier is disposed at a position lower than a corresponding articulation point of the spring link. Additionally, the articulation point of the track rod at the wheel carrier is disposed at a position higher than a corresponding articulation point of the spring link, Advantageously, the articulation point of the track rod on the wheel carrier is located, in a side view, forwardly of the corresponding articulation point of the compression strut, as viewed in a normal driving direction of the vehicle, and, in a plan view, the track rod crosses the compression strut.

The tension strut may, in accordance with the present invention, in a plan view, cross the compression strut and also, in the plan view, the track rod and tension strut may extend approximately in the same direction.

In accordance with still further features of the present invention, the track rod, in a plan view, extends approximately parallel to a line bisecting an angle between the camber strut and the compression strut and, advantageously, at least one of the articulation points of each of the single links is constructed so as to be elastic, with a hardness of the elastic articulations of the compression strut, tension strut, and camber strut being approximately the same.

Advantageously, a hardness of the elastic mounting or support means of the track rod is greater than a hardness of the elastic support or mounting means of the compression strut and, a hardness of the elastic supports of the track rod and spring link may, advantageously, be the same.

Preferably, in accordance with still further features of the present invention, a hardness of the elastic supports of the track rod and spring link correspond approximately to three times a hardness of the elastic support of the compression stroke.

Accordingly, it is an object of the present invention to provide an independent wheel suspension arrangement for driven rear wheels of motor vehicles, especially passenger motor vehicles, which avoids, by simple means, shortcomings and disadvantages encountered in the prior art.

Another object of the present invention resides in providing an independent wheel suspension for motor vehicles which is of lightweight construction and which employs connecting links free of torsional forces, Yet another object of the present invention resides in providing an independent wheel suspension arrangement which improves the overall handling characteristics of the motor vehicle.

A still further object of the present invention resides in providing an independent wheel suspension for motor vehicles which is simple in construction and therefore relatively inexpensive to manufacture.

Another object of the present invention resides in providing an independent wheel suspension for motor vehicles which ensures a good driving comfort under all load and operating conditions of the vehicle.

These and other objects, features, and advantages of the present invention will become more apparent from the following description when taken in connection with the accompanying drawings which show, for the purposes of illustration only, one embodiment in accordance with the present invention, and wherein.

Figure 1:
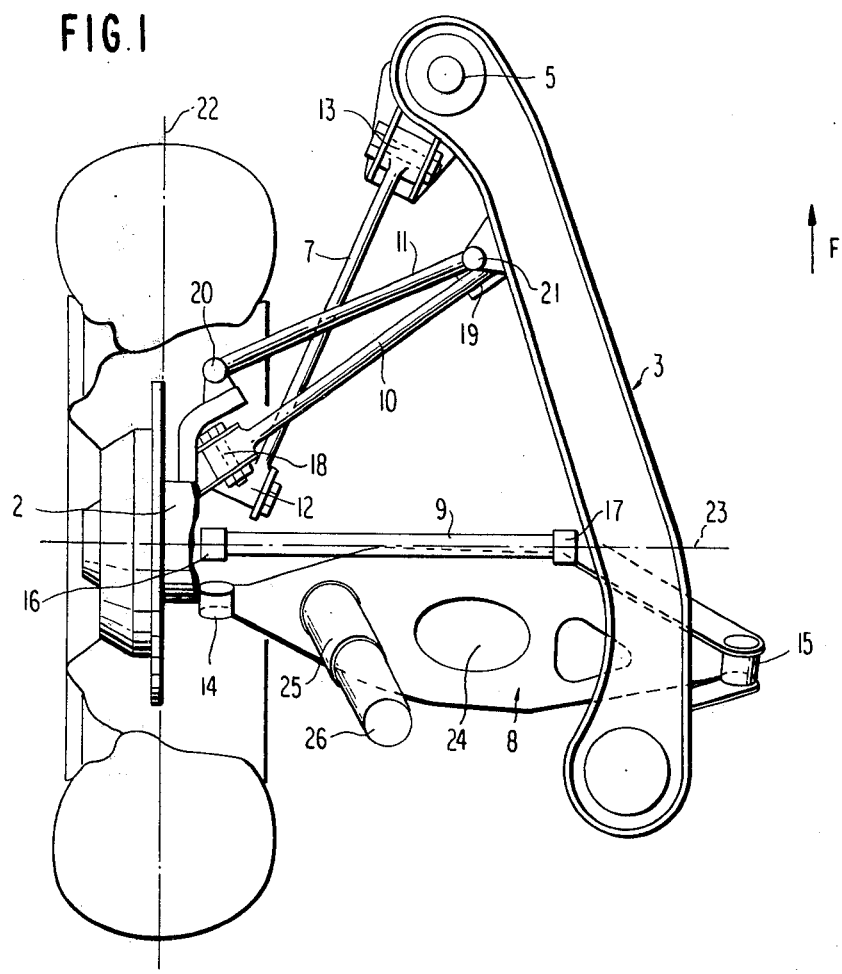
FIG. 1 is a partially schematic plan view of a wheel suspension arrangement constructed in accordance with the present invention wherein individual links guiding the wheel carrier are articulated to a supporting body which itself is supported elastically with respect to the vehicle body and which may be connected, through cross members to the supporting body associated with an opposite axle side.
Figure 2:
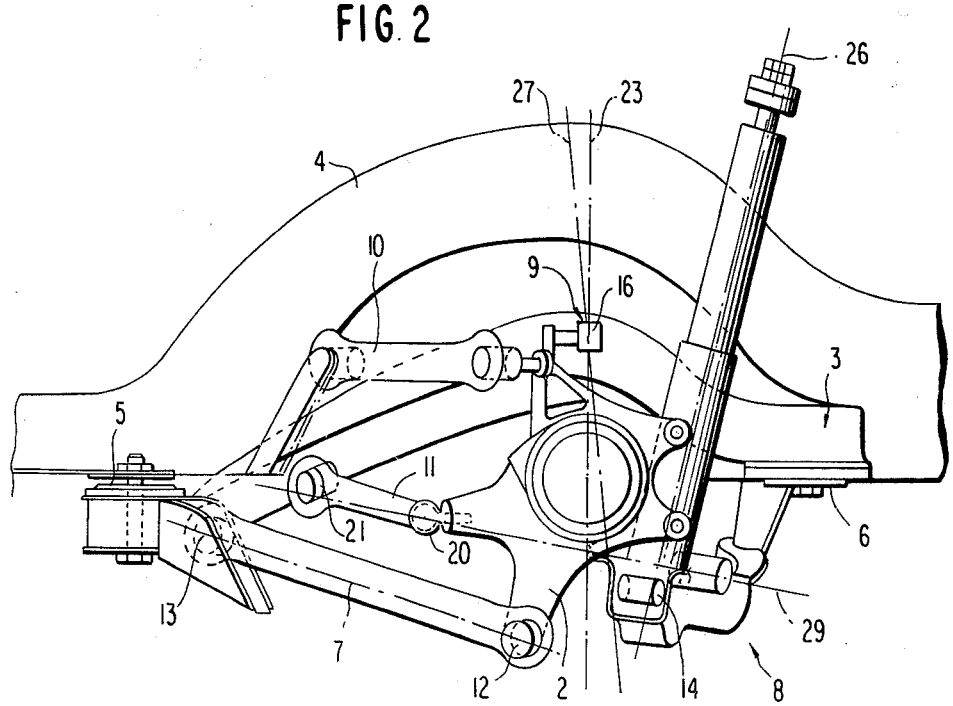
FIG. 2 is a partially schematic side view of the wheel suspension of FIG. 1.

Referring now to the drawings wherein like reference numerals are used throughout the various views to designate like parts and, more particularly, to FIGS. 1 and 2, according to these figures, an independent wheel suspension for driven rear wheels 1 of a passenger motor vehicle includes guide means for each rear wheel 1. The guide means includes five single links, articulated on a wheel side to a wheel carrier 2, and on a vehicle body side, to a supporting body generally designated by the reference numeral 3, with the supporting body 3 being elastically connected to a portion of the vehicle body such as, for example, a chassis side member 4.

The supporting body 3 is supported or mounted on the chassis side member 4 by way of elastic elements 5, 6 and, for this purpose, a pot-shaped mounting means is provided at a forward end of the supporting body 3, as viewed in a normal driving direction F of the vehicle, with the mounting means being open in an upward direction, that is, toward the chassis side member, and a pot-shaped mounting means at a rearward end of the supporting body 3 open in an opposite direction. Such a construction is fitting since the supporting body 3 is, generally, loaded by way of the single links in such a manner that the forward part, with respect to the driving direction F, is pressed upwardly against the chassis 4, while it is loaded in an opposite direction at the rearward end. By virtue of the insertion of elastic elements 5, 6 into the supporting body 3 from different sides thereof, the elastic elements 5, 6 are each subjected to pressure in a favorable manner.

Of the links providing wheel guidance, a compression strut 7 extends obliquely forwardly and inwardly, with a transverse link, serving as a spring link 8, forming a lower articulation for the wheel carrier 2. The upper articulation is formed by a camber strut 9 extending in a transverse direction and a tension strut 10 extending forwardly and inwardly. A track rod 11 is articuated on the wheel carrier 2, with the track rod 11 extending, as shown most clearly in FIG. 2, at a level between the compression strut 7 and tension strut 10 and, in a plan view, crosses the compression strut 7 and extends transversely inwardly somewhat more steeply than the tension strut 10. The compression strut 7 is articulated at the wheel carrier at an articulation point 12 and on a vehicle body side at an articulation point 13, with the spring link 8 being articulated to the wheel carrier at the articulation point 14 and on the vehicle body side at the articulation point 15. The camber strut 9 includes an articulation point 16 on a wheel carrier side and an articulation point 17 on a vehicle body side. The tension strut 10 is articulated at the wheel carrier 2 at an articulation point 18 and at the vehicle body side at an articulation point 19, with the track rod 11 being mounted on the side of the wheel carrier 2 at an articulation point 20 and on the vehicle body side at an articulation point 21. All the articulation points on the vehicle body side are disposed on the supporting body 3 in a manner not shown in detail in the drawings.

Of all the articulation points on the side of the wheel carrier 2, the articulation point 14 for the spring link 8, 16 for the camber strut 9, and 20 for the track rod 11 are essentially located in a plane which lies virtually parallel to the longitudinally extending center plane 22 of the wheel, with the plane being offset only slightly inwardly with respect to the plane 22. The articulation points 12 for the compression strut 7 and 18 for the tension strut 10 on a side of the wheel carrier 2 are, in contrast, arranged offset only slightly inwardly.

In a rear view, the spring link 8 extends virtually horizontally at a slight inclination outwardly and downwardly; whereas, in the plan view of FIG. 1, the spring link 8 extends, with an axis determined by its articuation points 14 and 15, slighly obliquely rearwardly and inwardly beginning at the articulation point 14 on a side of the wheel carrier 2. The camber strut 9, in a rear view, extends virtually horizontally and, in a plan view, is located substantially in a transversely extending wheel center plane 23. The articulation point 14 of the spring link 8 on the side of the wheel carrier 2 is arranged offset slightly rearwardly with respect to the transversely extending center plane 23 of the wheel.

Moreover, in the plan view of FIG. 1, the articulation point 12 of the compression strut on a side of the wheel carrier 2 is located forwardly of the transversely extending wheel center plane 23 and, more particularly, at a distance from the plane 23 which corresponds approximately to a distance of the articulation point 14 of the spring link 18 on the side of the wheel carrier 2 from the plane 23.

The articulation point 18 of the tension strut 10 on a side of the wheel carrier 2 is located at a greater distance from the transversely extending center plane 23 of the wheel, with an articulation point 18 being located substantially centrally between the articulation point 20 of the track rod 11 on the side of the wheel carrier 2 and the corresponding articulation point 12 of the compression strut 7.

As shown most clearly in the side view of FIG. 2, the articulation point 12 of the compression strut 7 on the side of the wheel carrier 2 is disposed at the lowest position of all of the articulation points on the side of the wheel carrier 2. On the side of the wheel carrier 2, the articulation point 14 of the spring link 8, the articulation point 20 of the track rod 11, the articulation point 18 of the tension strut 10, and the articulation point 16 of the camber strut 9 sequentially follow the articulation point 12 of the compression strut 7. Further details of the positions or relationship of the respective articulation points with respect to each other and, in particular, positions of the respective axes of the links are evident from the drawings with such illustrated relationships forming an integral part of the present invention. More particularly, as evident from FIG. 2, the compression strut 7 and track rod 11 extends substantially parallel and obliquely upwardly and forwardly and, more particularly, at an angle of inclination of approximately 18°. In contradistinction thereto, in a side view, the tension strut 10 and camber strut 9 extend virtually horizontally; whereas, in a side view, the spring link 8 extends obliquely rearwardly and upwardly and, preferably, at an angle of approximately 10°.

Figure 3:
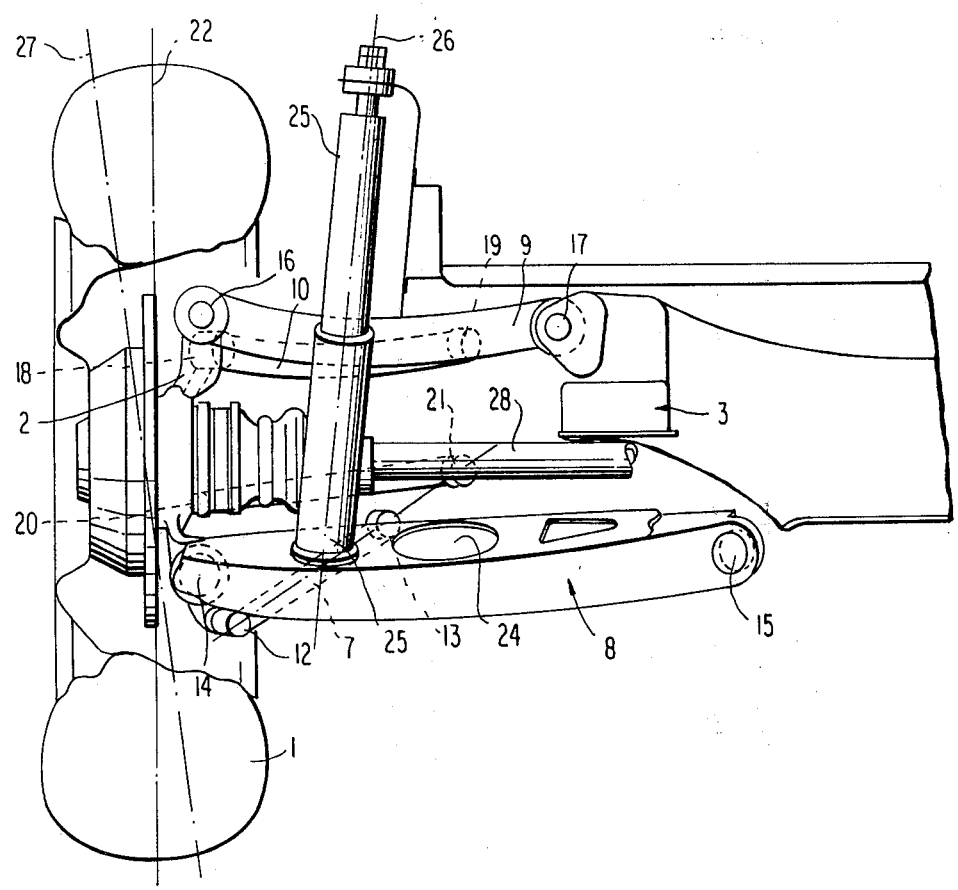
FIG. 3 is a rear view of the wheel suspension of FIGS. 1 and 2.

A spring (not shown) is supported in an area designated 24 on the spring link 8 with the shock absorber 25 also being supported on the spring link 8. The spring and shock absorber 25 are each symmetrically disposed with respect to an axis of the spring link fixed by the articulation points 14, 15, and, as evident from FIG. 2, the bearings provided at the articulation points 14, 15 of the spring link each have pivot axes which are inclined obliquely rearwardly and downwardly at an inclination to the horizontal which is approximately 10° to 15°. By virtue of this arrangement of the spring and shock absorber 25, as shown most clearly in FIG. 3, a longitudinal axis 26 of the shock absorber 25 extends obliquely rearwardly and upwardly.

As shown most clearly in the plan view of FIG. 1, the longitudinal center axes of the spring link 8 and compression strut 7 intersect in an area near the longitudinally extending center plane 22 of the wheel at a position which is slightly offset with respect to the plane 22 toward a center of the vehicle. With regard to the transversely extending center plane 23 of the wheel, the intersection point of the longitudinal axes of the spring link 8 and compression strut 7 is offset slightly rearwardly. In contradistinction of the intersection of the longitudinal axes to the spring link 8 and compression strut 7, an intersection point of the longitudinal axes of the camber strut 9 and tension strut 10 is located at a position outside of the longitudinally extending center plane 22 of the wheel and in the transversely extending center plane 23 of the wheel. A vertical pivot axis 27 extending obliquely rearwardly and downwardly, in a side view of the suspension, is thereby obtained for the wheel 1, under the influence of lateral forces, due to the elastic nature of the mounting or supporting means provided at the articulation points.

The position of the vertical pivot axis 27 is achieved with a compression strut which is relatively short in comparison with the spring link 8 so that the wheel suspension has a relatively short overall length in a longitudinal direction of the vehicle. However, good transmission ratios are provided for the spring 24 and shock absorber 25 since the spring link 8 has and can have a comparatively great length without contacting the drive parts, namely, the half shafts 28 (FIG. 3) and/or differential gear (not shown).

In the construction of the suspension arrangement of the present invention, a length of the spring link is substantially greater than a length of a theoretically equivalent link for links determining the lower articulation of the wheel carrier 2, namely, the compression strut 7 and spring link 8, whereby despite a relatively great length of the spring link 8 and correspondingly good transmission ratios for the spring and shock absorber 25, it is possible to obtain, for an instantaneous center of the vehicle determining a roll axis, a position which ensures that, during a cornering, the vehicle is not lifted but lowered in the region of the rear wheel suspension as far as the vehicle body is concerned.

Additionally, in the wheel suspension of the present invention, the elasticity of the elastic supporting or mounting means, especially in bearing areas determining or defining the articulation points on the vehicle body side are selected so that the transverse support in the lower articulation for the wheel carrier is harder than the upper articulation. Since the track rod 11 also has a relatively hard support, it follows that the wheel 1 tends to pivot upwardly and slightly outwardly under the influence of lateral forces, with the pivot axis being an axis 29 (FIG. 2) determined by the articulation points 14 and 20 of the spring link 8 and track rod 11, respectively, on the side of the wheel carrier 2, with the axis 29, in a side view, extending obliquely forwardly and upwardly. In conjunction with this position of the pivot axis 29, an outwardly pivoting movement of the wheel 2 under the influence of lateral forces tends to cause the wheel 2 to go in a toe-in direction, which is desirable if one seeks to provide a vehicle having a tendency to understeer. In conjunction with the arrangement of the track rod 11, preferably disposed at a height of a middle region of the wheel, the elastic mounting or support means provided also permits an influence on the track behavior in a toe-in or toe-out direction under longitudinal forces. For example, if the wheel carrier 2 executes, under the influence of longitudinal forces, a pivoting movement about an instantaneous center of rotation present in a side view, then a pivoting movement of the track rod 11 arises, specifically in such a manner that the track rod 11 is carried downwardly on the side of the wheel carrier 2 during braking and upwardly on the side of the wheel carrier 2 during a starting of the vehicle. With respect to a position of the track rod 11 in the rear view of FIG. 3, this means that the wheel carrier 2 is pivoted through the track rod 11 in the toe-in direction during a breaking of the vehicle and in a toe-out direction during a starting with both of these effects being desirable.

The wheel suspension arrangement of the present invention provides a solution in which tilting forces on the wheel carrier 2 which are caused by forces of the spring and/or shock absorber 25 are largely eliminated because of the position of the point of articulation of the spring link 8 on the wheel carrier 2. Moreover, by the provision of a relatively short compression strut 7 and a relatively long spring link 8, an ideal pivot axis 27 is obtained for the wheel 2, with the pivot axis 27 having a piercing point through the wheel contact plane which is located behind the transversely extending center plane 23 of the wheel thereby resulting in the attainment of favorable handling characteristics which are achieved under the influence of lateral forces and, at the same time, providing a good spring transmission and desired support against pitching of the motor vehicle during braking and starting.

In addition to the above-noted advantages, the position of the track rod 11 also guarantees, at the same time, desired controlled tendencies during starting and braking of the vehicle. These requirements would be fulfilled in spite of the soft support of the individual links which are selected with a view toward achieving a desired comfort and in spite of a generally particularly lightweight construction of the wheel suspension as a whole. Moreover, the basic arrangement of the independent wheel suspension of the present invention offers possibilities of additionally influencing, in a particular desired direction, control tendencies toward toeing-in or toeing-out and, moreover, of encouraging in the vehicle, by an appropriate influencing of an instantaneous center determining the roll axis, a behavior which ensures that, during a cornering of the vehicle, the vehicle body as a whole is not lifted but lowered.

Additionally, as shown in the plan view of FIG. 1, the articulation points 19, 21 of the tension strut 10 and track rod 11 on the vehicle body side are virtually located one above the other and, in fact, are rearwardly offset with respect to the driving direction F, with respect to the articulation point 13 of the compression strut 7 on the vehicle body side. The articulation points 19, 21 on the vehicle body side lie, as a pair, along a straight reference line which connects the articulation points 13 and 15 of the compression strut 7 and spring link 8 on the vehicle body side. The articulation point 17 is offset outwardly with respect to the reference straight line, to the extent that a further reference straight line connecting the articulation points 13 and 17 extends at a short distance outside of the articulation points 19, 21. With regard to the straight reference line extending between the articulation points 13 and 15, the articulation points 19 and 21 are disposed at a distance from the articulation point 15 which corresponds approximately to four times a distance from the articulation point 13. A distance between the articulation points 19 and 21 and the articulation points 17 corresponds approximately to two and one half times a distance from the articulation point 13. In conjunction with the above-described position of the articulation points on the wheel carrier side, it follows that, in a plan view, the compression strut 7 is crossed by the tension strut 10 and track rod 11, with the track rod 11 extending somewhat more steeply in a transverse direction than the tension strut 10. An angle between the longitudinal center axes of the tension strut 10 and track rod 11, in a plan view, is equal to approximately 10°.

With regard to the elasticity of the elastic mounting or supporting means for the respective links, in the illustrated embodiment, the camber strut 9 and tension strut 10 extending, in a plan view, at approximately 35° thereto have a support which is relatively soft and approximately of the same hardness for both struts 9, 10. A harder support, corresponding to approximately three times of a hardness for the support for the compression strut 9 and tension strut 10, is provided for the spring link 8 which extends, in a plan view, at an angle of approximately 70° to the compression strut 7. A hardness of the support for the compression strut 7 corresponds approximately to a hardness of the support for the tension strut 10 and camber strut 9. A relatively hard support, corresponding approximately to three times a hardness of the support for the tension strut 10 or camber strut 9, may also be provided for the track rod 11.

In a rear view, and in the illustrated installed position of the wheel suspension of the present invention, the pivot axis 27 extends obliquely inwardly and downwardly and intersects the wheel contact plane so as to be offset slightly inwardly with respect to the longitudinally extending center plane 22 of the wheel. This theoretical position is changed under the influence of longitudinal forces and, in accordance with the present invention, a posution is finally adopted, under an influence of longitudinal forces and due to the positions or relationships of the link and resiliences of the elastic mounting means, in which the pivot axis 27, in a rear view, lies at least approximately in the longitudinally extending center plane 22 of the wheel, thereby resulting in the occurrence of practically no track changes under the influence of the longitudinal forces and leading to a low rolling resistance and, correspondingly, a low tire wear.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. An independent wheel suspension for a motor vehicle, the wheel suspension comprising wheel guide means for each suspended wheel, each of the wheel guide means including upper and lower articulation means for supporting a wheel carrier at a body portion of the vehicle, characterized in that the upper articulation means includes a transversely extending camber strut means and, as viewed in the normal driving direction, a forwardly extending tension strut means and the lower articulation means includes a compression strut means extending obliquely forwardly, as viewed in a normal driving direction of the vehicle, and inwardly toward a longitudinally extending center plane of the vehicle, means are provided for articulatingly connecting the compression strut means to the wheel carrier and the body portion of the vehicle, and a spring link extending transversely of the vehicle for carrying a spring suspension means, means are provided for articulatingly connecting the spring link at the wheel carrier and at the body portion of the vehicle, a point of articulation of the spring link at the wheel carrier is disposed at a position behind a transversely extending center plane of the wheel, as viewed in the normal driving direction, and near a longitudinally extending center plane of the wheel, the compression strut means and spring link are arranged such that a point of intersection of a longitudinal center axis of the compression strut means and the spring link is disposed rearwardly of the transversely extending center plane of the wheel near the longitudinally extending center plane of the wheel, the guide means further includes a track rod means extending substantially transversely of the vehicle obliquely forwardly, as viewed in the normal driving direction, and inwardly toward the longitudinal center plane of the vehicle, the track rod means is disposed forwardly of the transversely extending center plane of the wheel, and in that means are provided for articulatingly connecting the track rod means to the wheel carrier and the body portion of the vehicle wherein the point of articulation of the track rod means at the wheel carrier is higher than the point of articulation of the spring link at the wheel carrier.

2. An independent wheel suspension according to claim 1, characterized in that the wheels are driven rear wheels of a passenger motor vehicle, the compression strut means and the spring link form a lower articulation means for the wheel carrier of the respective wheels, the compression strut means is articulated at the wheel carrier at a position near the point of articulation of the spring link to the wheel carrier, and in that the spring suspension means includes a spring means and a shock absorber means.

3. An independent wheel suspension according to claim 2, characterized in that a point of articulation of the compression strut means at the wheel carrier is lower than the point of articulation of the spring link at the wheel carrier.

4. An independent wheel suspension according to claim 1, characterized in that, in a side view of the wheel suspension, the point of articulation of the track rod means at the wheel carrier is disposed forwardly of a point of articulation of the compression strut means at the wheel carrier.

5. An independent wheel suspension according to claim 4, characterized in that the track rod means and compression strut means are arranged such that, in a plan view of the wheel suspension, the track rod means crosses the compression strut means.

6. An independent wheel suspension according to one of claims 2, 3, 4 or 5, characterized in that, in a plan view of the wheel suspension, the tension strut means crosses the compression strut means.

7. An independent wheel suspension according to claim 6, characterized in that, in a plan view of the wheel suspension, the track rod means and tension strut means extending approximately in the same direction.

8. An independent wheel suspension according to claim 7, characterized in that, in a plan view of the wheel suspension, the track rod means extends approximately parallel to a line bisecting an angle between the camber strut means and the compression strut means.

9. An independent wheel suspension according to claim 8, characterized in that at least one of the means for articulatingly connecting the compression strut means, spring link, track rod means, camber strut means, and tension strut means, to the wheel carrier and body portion of the vehicle, respectively, is an elastic mounting means.

10. An independent wheel suspension according to claim 9, characterized in that the elastic mounting means of the compression strut means and the tension strut means have an approximately equal hardness.

11. An independent wheel suspension according to claim 10, characterized in that the elastic mounting means of the track rod means has a hardness greater than the hardness of the elastic mounting means of the compression strut means.

12. An independent wheel suspension according to claim 11, characterized in that the elastic mounting means of the track rod means and the spring link have an approximately equal hardness.

13. An independent wheel suspension according to claim 12, characterized in that the hardness of the elastic mounting means of the track rod means and spring link is equal to approximately three times the hardness of the elastic mounting means of the compression strut means.

14. An independent wheel suspension according to one of claims 2 or 3, characterized in that the track rod means and compression strut means are arranged such that, in a plan view of the wheel suspension, the track rod means crosses the compression strut means.

15. An independent wheel suspension according to one of claims 2, 3, 4 or 5, characterized in that, in a plan view of the wheel suspension, the track rod means and tension strut means extend approximately in the same direction.

16. An independent wheel suspension according to one of claims 2, 3, 4 or 5, characterized in that, in a plan view of the wheel suspension, the track rod means extends approximately parallel to a line bisecting an angle between the camber strut means and the compression strut means.

17. An independent wheel suspension according to one of claims 1, 2 or 3, characterized in that, in a side view of the wheel suspension, the point of articulation of the track rod means at the wheel carrier is disposed forwardly of a point of articulation of the compression strut means at the wheel carrier.

18. An independent wheel suspension according to claim 1, characterized in that a point of articulation of the compression strut means at the wheel carrier is lower than the point of articulation of the spring link at the wheel carrier.

19. An independent wheel suspension according to claim 1, characterized in that at least one of the means for articulatingly connecting the compression strut means, the spring link means, and track rod means to the wheel carrier and body portion of the vehicle, respectively, is an elastic mounting means.

20. An independent wheel suspension according to claim 19, characterized in that the elastic mounting means of the track rod means has a hardness greater than the hardness of the elastic mounting means of the compression strut means.

21. An independent wheel suspension according to one of claims 19 or 20, characterized in that the elastic mounting means of the track rod means and the spring link have an approximately equal hardness.

22. An independent wheel suspension according to claim 21, characterized in that the hardness of the elastic mounting means of the track rod means and spring link is equal to approximately three times the hardness of the elastic mounting means of the compression strut means.

23. An independent wheel suspension according to one of claims 19 or 20, characterized in that elastic mounting means are provided for articulatingly connecting the camber strut means and the tension strut means to at least one of the wheel carrier and the body portion of the vehicle.

24. An independent wheel suspension according to claim 23, characterized in that the elastic mounting means of the compression strut means and the tension strut means have an approximately equal hardness.

25. An independent wheel suspension according to claim 24, characterized in that the elastic mounting means of the track rod means and the spring link have an approximately equal hardness.

26. An independent wheel suspension according to claim 25, characterized in that the hardness of the elastic mounting means of the track rod means and spring link is equal to approximately three times the hardness of the elastic mounting means of the compression strut means.

* * * * *